Mar. 20, 1923.
A. D. LIGHTNER ET AL.
LIFTING TRUCK.
FILED JAN. 6, 1919.
1,448,806.
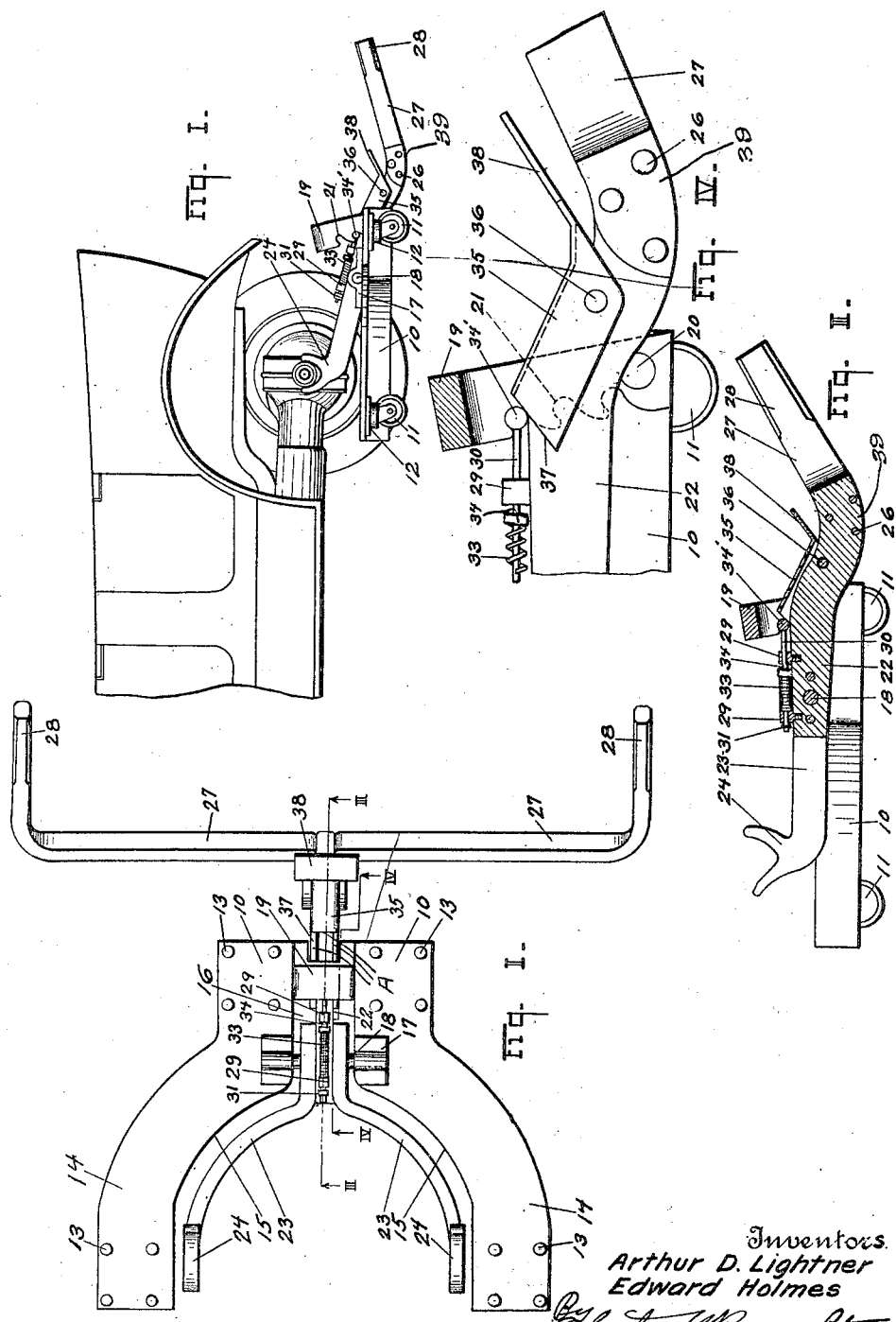
Inventors
Arthur D. Lightner
Edward Holmes
Chester V. Braselton
Attorney Patented Mar. 20, 1923.

1,448,806

UNITED STATES PATENT OFFICE.

ARTHUR D. LIGHTNER AND EDWARD HOLMES, OF TOLEDO, OHIO, ASSIGNORS TO THE WILLYS-OVERLAND COMPANY, OF TOLEDO, OHIO, A CORPORATION OF OHIO.

LIFTING TRUCK.

Application filed January 6, 1919. Serial No. 269,916.

*To all whom it may concern:*

Be it known that we, ARTHUR D. LIGHTNER and EDWARD HOLMES, citizens of the United States, residing at Toledo, county of Lucas, and State of Ohio, have invented certain new and useful Improvements in Lifting Trucks, of which we declare the following to be a full, clear, and exact description.

This invention relates to improvements in lifting trucks, and more particularly to trucks of this character adapted for use in lifting one end of an automobile, for the purpose of transferring the same from place to place. This construction is particularly adapted for use in raising the rear axle of an automobile, and the consequent disengagement of the rear wheels from the surface upon which they rest whereby the automobile may be moved from place to place without operating any part of the driving mechanism.

One object of the invention is to provide an improved lifting truck of the character described which is particularly applicable for use in connection with automobiles.

A further object of the invention is to provide a lifting truck of this character wherein the load may be held in raised position and readily released therefrom when desired.

A further object of the invention is to provide an improved lifting truck, which is of simple construction and efficient in operation.

Further objects of the invention relate to economies of manufacture and details of construction, as will hereinafter appear from the detailed description to follow.

We accomplish the objects of our invention in one instance by the devices and means described in the following specification, but it is evident that the same may be varied widely without departing from the scope of the invention as pointed out in the appended claims.

A structure constituting one embodiment of our invention, which may be the preferred, is illustrated in the accompanying drawing, forming a part hereof, in which:

Figure I is a side elevation of the improved lifting truck, showing its position with relation to an automobile to be lifted.

Figure II is a top plan view of the improved truck.

Figure III is a vertical sectional view taken along the line III—III of Figure II.

Figure IV is a vertical sectional view taken along the line IV—IV of Figure II.

In the drawing, similar reference characters refer to corresponding parts throughout the several views, and the sectional views are taken looking in the direction of the small arrows at the end of the section lines.

Referring to the drawings, 10 indicates the platform or frame portion of the lifting truck, mounted upon a plurality of caster wheels 11, each of which is suitably mounted in a bracket 12 secured to the underside of the platform in any suitable manner, as by bolts or rivets 13. The platform 10 has two forwardly extending forked portions 14 so formed as to provide a recessed opening 15 in the forward portion of the platform. The rearward portion of the platform is provided with a channelled opening 16 within which is mounted for pivotal movement the lifting mechanism. Secured to the upper surface of the platform upon opposite sides of the channelled opening are bearings 17 provided for the shaft 18, upon which is pivotally mounted the lifting mechanism to be hereinafter described. A U-shaped member 19 is mounted within the channelled portion of the platform, having its downwardly extending ends firmly secured to opposite portions of the platform, as at 20, and having the forward edges of the downwardly extending arms provided with a plurality of registering recesses 21. Pivotally mounted upon the shaft 18 is a lifting lever 22, provided with a pair of forwardly extending divergent arms 23, each of which is provided with an upwardly extending forked supporting member 24 at its forward end. The recessed opening 15 formed in the front edge of the platform provides a suitable recess for the reception of the divergent arms 23 when in their normal lowered position where they are protected against injury and remain out of the way when not in use. The divergent arms 23 are so shaped as to be particularly adapted for use upon the rear axle of an automobile, since by their divergent shape they extend forwardly at each side of the differential housing, thus avoiding engagement with the differential housing and furnishing a broader supporting base for the raised axle. The upwardly extending forks 24 are of suitable shape to underlie the rear axle housing and receive the same therein to properly support the rear axle. Secured to the lever 22 at a point near its rear end by bolts or other suitable fastening means 26 are a pair of rearwardly extending divergent handles 27 provided with hand-grips 28, conveniently arranged for use by the operator.

Mounted upon the upper surface of the lever 22 are a plurality of bearing members 29 carrying a rod 30 which is positioned for sliding movement longitudinally of the lever 22, and is secured against removal from the bearing member by a cotter-pin 31. A compression spring 33 surrounds the slidable rod 31 between the bearing members, and is adapted to bear at one end against the forward bearing member 29, and at its other end against a collar 34 mounted upon the slidable rod 30. A transverse rod 34' is secured to the slidable rod 30 at the rear end thereof, and is adapted to be forced into the registering notches 21 cut in the forward edges of the downwardly extending arms of the U-shaped member, by the spring 33. The transverse rod 34' lying upon the upper face of the lever 22 thus acts as a detent for maintaining the forward end of the lever in various positions of vertical adjustment, together with the load carried thereby. A detent releasing lever 35 is pivoted to the lever 22 as at 36, and provided upon its forward edge with a beveled portion 37 adapted to contact with the transverse rod 34', and to force the same from engagement with the registering notches 21 upon depression of the rear end of the detent releasing lever 35, after the outer end of the lever 22 has been slightly depressed to cause the rod 34' to be lowered in the notches 21. The rear end of the detent releasing lever 35 is provided with an angular extending portion 38, which may be readily actuated by the operator for the purpose of releasing the rod 34' from the registering notches 21. When the rod 34' is released from engagement with the notches 21, the weight carried by the arms 23 may be lowered by the operator.

It will be seen that this lifting truck is particularly applicable for use for lifting the rear axle of an automobile, by reason of the forked construction of the forward end of the lifting lever, as well as the forked construction of the platform by reason of which the platform and the divergent forwardly extending arms can be readily placed in position in such a manner as to embrace the differential housing, and when the lifting lever is depressed, the divergent forwardly extending arms will bear upon the rear axle housing at points located upon opposite sides of the differential housing to raise the same into elevated position. It will be readily understood that when the truck is placed in proper position for raising the axle of an automobile, pressure may be exerted downwardly upon the handles 28 of the rearwardly extending arms 27, thereby causing the lever 22 to pivot about the shaft 18, and consequently raise the axle of the automobile to the desired height. If it is desired to raise the axle still higher the lever may be still further depressed until the downwardly bent portion 39 thereof engages the floor upon which the wheels of the vehicle rest, at which time the floor will act as a fulcrum upon which the lever will pivot in rear of the normal pivot point 18, it being understood that in this case the outer end of the truck will also be raised. In effecting this operation it may be necessary to increase the length of the outer end of the lever and this may be readily accomplished by the use of a pipe inserted over the handle portion 28 of the lever. As the sliding rod 30 is free to move rearwardly at all times, except when acting against the detent releasing lever 35, the transverse rod 34' will be forced into the oppositely registering slots or notches 21 as the rearward end of the lever 22 is depressed, thus automatically holding the axle of the automobile in raised position until such time as the detent releasing lever 35 is operated. When it is desired to lower the axle of the automobile to its original position the detent releasing lever 35 is operated by pressing down upon the angular portion 38, thereby bringing the beveled face 37 into contact with the transverse rod 34' and forcing the same forwardly out of engagement with the registering notches 21, when the axle may be lowered by releasing the pressure upon the handle portions 28 of the lever.

While we have shown and described in considerable detail a specific embodiment of our invention, it is to be understood that this showing and description is illustrative only and for the purpose of rendering our invention more clear, and that we do not regard the invention as limited to the details of construction illustrated or described, nor any of them, except in so far as we have included such limitation within the terms of the following claims, in which it is our intention to claim all novelty inherent in our invention broadly as well as specifically.

Having thus described our invention, what we claim as new and desire to secure by Letters Patent, is:

1. In a device of the class described, in combination, a movable platform, a lever pivoted thereon and provided with supporting arms diverging forwardly from a point in advance of the pivot point of the lever, and means for holding the supporting arms in elevated position.

2. In a device of the class described, in combination, a platform comprising separate sections connected by an arched member and provided with a recess in one side thereof, a lever pivoted on the platform and provided with divergent supporting arms adapted to lie within the recessed opening in the platform, and means for holding the supporting arms in elevated position.

3. In a device of the class described, in combination, a movable platform comprising separate sections spaced apart and connected by a vertically disposed arched member having a recess in one side thereof, a lever pivoted upon the platform and provided with divergent supporting arms, means co-operating with the recess in said arched member for holding the supporting arm in elevated position, and means for releasing said holding means.

4. In a device of the class described, in combination, a platform provided with a recess in one side thereof, a lever pivoted on the platform and provided with supporting arms adapted to lie within the recessed opening in the platform, means for holding the supporting arm in elevated position, and a foot actuated lever for releasing said holding means.

5. In a device of the class described, in combination, a base frame formed of sections having forwardly extending portions diverging outwardly to form a recess in one side of the frame, an arched member connecting the sections, a lever pivoted on the frame, said lever being provided with a pair of forwardly diverging arms and a pair of rearwardly diverging arms.

6. In a device of the class described, in combination, a base frame formed of sections having forwardly extending portions diverging outwardly to form a recess in one side of the frame, an arched member connecting the sections, a lever pivoted on the frame, said lever being provided with a pair of forwardly diverging arms, and a pair of rearwardly diverging arms, and means for holding the forwardly diverging arms in elevated position.

7. In a device of the class described, in combination, a base frame provided with a channelled opening therein, a lever mounted for pivotal movement within said channelled opening and provided with a pair of forwardly diverging arms, and means for holding one end of the lever in elevated position.

8. In a device of the class described, in combination, a base frame, with a channelled opening therein, a lever mounted for pivotal movement within said channelled opening, means for holding one end of the lever in elevated position, and a second lever pivoted to the first mentioned lever for releasing said holding means.

9. In a device of the class described, in combination, a base frame provided with a recess in one side thereof, and a channelled opening communicating with said recess, a lever provided with diverging arms, which are adapted to lie within the recess, said lever being mounted for pivotal movement within the channelled opening, and means for holding the divergent arms in elevated position.

10. In a device of the class described, in combination, a base frame provided with a recess in one side thereof, and a channelled opening communicating with said recess, a lever provided with divergent arms which are adapted to lie within the recess, said lever being mounted for pivotal movement within the channelled opening, means for holding the divergent arms in elevated position, and means for releasing said holding means.

11. In a lifting truck, a base frame formed of sections separated by a channeled opening, a lever pivotally mounted upon the base frame and positioned within the channeled opening, and an arched member extending over the lever and connecting the said sections.

12. In a lifting truck, a base frame formed of sections separated by a channeled opening, a lever pivotally mounted upon the base frame and positioned within the channeled opening, an arched member extending over the lever and connecting the said sections, and means associated with the arched member for holding the lever in raised position.

13. In a lifting truck, a base frame formed of sections separated by a channeled opening, a lever pivotally mounted upon the base frame and positioned within the channeled opening, an arched member extending over the lever and connecting the said sections, means associated with the arched member for holding the lever in raised position, and means for releasing said holding means.

14. In a lifting truck, a base frame formed of sections separated by a channeled opening, a lever pivotally mounted on said frame, means for holding said lever in raised position, and a second lever pivotally supported by said first mentioned lever for releasing said holding means.

15. In a lifting truck, a base frame, a lever pivotally mounted on said frame, a spring pressed detent carried by said lever for holding the same in raised position, and a second lever pivoted upon said first named lever for releasing said holding means.

16. In a lifting truck, a base frame, a lever pivotally mounted on said frame, an arched member extending over said lever, and means co-operating with the arched member for holding the lever in raised position.

17. In a lifting truck, a base frame, a lever pivotally mounted on said frame, an arched member extending over said lever, and a sliding detent carried by said lever and co-operating with the arched member for holding the lever in raised position.

18. In a lifting truck, a base frame, comprising spaced side members, an arched member connecting said side members, a lever pivoted upon the side members in advance of said arched member and extending beneath and limited in its upward movement by said arched member, movable locking means for the lever adapted to be held by the arched member and means carried by the lever for effecting the release of said locking means.

19. In a lifting truck, a base frame and a lever pivoted upon the frame and having a portion intermediate its pivot and outer extremity adapted to engage the floor upon which the truck is mounted to form a second pivotal point about which the lever is adapted to fulcrum.

20. In a lifting truck, a base frame, a lever pivoted upon the frame and having a portion intermediate its pivot and outer extremity adapted to engage the floor upon which the truck is mounted to form a second pivotal point about which the lever is adapted to fulcrum and means for locking the lever in its several positions of adjustment.

21. In a lifting truck, a base frame, a lever pivoted upon the frame and having a depressed portion intermediate its pivot and outer extremity adapted to engage the floor upon which the truck is mounted to form a second pivotal point about which the lever is adapted to fulcrum, releasable locking means carried by the lever adapted to interlock with a portion of the frame and means for effecting the release of said locking means.

In testimony whereof, we affix our signatures.

ARTHUR D. LIGHTNER
EDWARD HOLMES.